(12) United States Patent
Laserson et al.

(10) Patent No.: US 11,887,139 B2
(45) Date of Patent: Jan. 30, 2024

(54) REAL-TIME ALERTS FOR ABNORMAL ITEM PRICING

(71) Applicant: NCR Voyix Corporation, Atlanta, GA (US)

(72) Inventors: Itamar David Laserson, Givat Shmuel (IL); Rotem Chudin, Kfar-Saba (IL); Julie Dvora Katz Ohayon, Ashdod (IL); Moshe Shaharur, Tel-Aviv (IL)

(73) Assignee: NCR Voyix Corporation, Atlanta, GA (US)

( * ) Notice: Subject to any disclaimer, the term of this patent is extended or adjusted under 35 U.S.C. 154(b) by 318 days.

(21) Appl. No.: 17/084,773

(22) Filed: Oct. 30, 2020

(65) Prior Publication Data

US 2022/0138784 A1 May 5, 2022

(51) Int. Cl.
| | |
|---|---|
| *G06Q 30/00* | (2023.01) |
| *G06Q 20/00* | (2012.01) |
| *G06Q 10/00* | (2023.01) |
| *G06N 20/00* | (2019.01) |
| *G06F 16/00* | (2019.01) |
| *G06F 9/00* | (2006.01) |
| *G06Q 30/0201* | (2023.01) |
| *G06F 16/22* | (2019.01) |

(Continued)

(52) U.S. Cl.
CPC ......... *G06Q 30/0206* (2013.01); *G06F 9/542* (2013.01); *G06F 16/2237* (2019.01); *G06F 16/2264* (2019.01); *G06N 20/00* (2019.01); *G06Q 10/087* (2013.01); *G06Q 20/201* (2013.01); *G06Q 30/0603* (2013.01); *G06Q 30/0633* (2013.01)

(58) Field of Classification Search
CPC .................. G06Q 30/00; G06Q 10/00–50/00
USPC ........................................................ 705/7.35
See application file for complete search history.

(56) References Cited

U.S. PATENT DOCUMENTS

| | | | |
|---|---|---|---|
| 8,374,907 B1 * | 2/2013 | Choi ...................... | G06Q 30/02 |
| | | | 705/26.1 |
| 2011/0295722 A1 | 12/2011 | Reisman | |

(Continued)

FOREIGN PATENT DOCUMENTS

| | | |
|---|---|---|
| JP | 2007-257282 | 10/2004 |
| JP | 2019-125257 | 7/2019 |
| WO | 2019145395 | 8/2019 |

OTHER PUBLICATIONS 20-0160_EP Search Report.
JP Office Action and English-language machine translation thereof.

*Primary Examiner* — Mustafa Iqbal
(74) *Attorney, Agent, or Firm* — Schwegman Lundberg & Woessner, P.A.

(57) ABSTRACT

An item price that is noted in a transaction for an item is identified. Any discount or item price override is identified for the transaction. A catalogue price for the item is obtained. Similar items associated with the item are determined based on mapped transaction contexts for the item and the similar items within a multidimensional space. Similar item prices are obtained and a median price for the item and similar items is calculated. A real-time price alert is sent to a resource that is associated with processing or handling the transaction when the item price, adjusted for any discount or item price override, deviates (above or below) from the median price by a threshold amount.

7 Claims, 4 Drawing Sheets

(51) Int. Cl.
*G06F 9/54* (2006.01)
*G06Q 10/087* (2023.01)
*G06Q 20/20* (2012.01)
*G06Q 30/0601* (2023.01)

(56) References Cited

U.S. PATENT DOCUMENTS

2014/0172502 A1* 6/2014 Ryks ................. G06Q 30/0202
                                                      705/7.31
2019/0355030 A1* 11/2019 Saha ...................... G06Q 10/04
2020/0380570 A1* 12/2020 Ramakrishnan ...... G06F 18/241
2021/0241299 A1* 8/2021 Ramini .................. G06N 5/025
2022/0138772 A1* 5/2022 Laserson ............ G06Q 30/0201
                                                      705/7.33
2023/0032388 A1* 2/2023 Gershon ............. H04L 41/5009

* cited by examiner

REAL-TIME ALERTS FOR ABNORMAL ITEM PRICING

BACKGROUND

Pricing plays a critical role in every consumer's purchase decision. Pricing mistakes are common, specifically in the large catalogs that are typical in the grocery and department store retail segments. Retailers are struggling to Identify those errors early enough, so they avoid significant financial losses.

A typical retailer's catalog may contain hundreds of thousands of items that change their price on a daily basis. The pricing system is often connected to several systems, which can cause confusion leading to miss-pricing, which is extremely hard to identify. When a product is miss-priced, the retailers main concerns are: 1) if a product's price is not market compliant, the price of the product will increase the likelihood that the customer will shop at a competitor store; 2) erosion of customer trust; 3) profit and revenue loss—when a price glitch is in favor of the customer, it could trigger significant financial losses to the retailer within a matter of minutes; 4) harm that occurs to the retailer's value proposition—when a price glitch is in favor of the retailer, it may damage the retailer's reputation, e.g., "every day low prices;" and 5) legal risks related to price agreements with manufacturers.

Thus, it is critical for retailers to monitor prices of items and to identify price anomalies as soon as possible to avoid significant financial losses and damage to the retailer's revenue, brand, and customer satisfaction.

Retailers use a number of approaches to detect and rectify product miss-pricing. For example, retailers may perform manual price checking which is usually performed by the store manager. However, this solution is very time-consuming and since there are so many items in the catalog and several managing systems, there is a high probability that pricing mistakes will be missed. Another approach is automatic price checking based on the item's historical price (time series) and competitor prices. However, since the market is extremely dynamic and prices are often affected by seasonality, market excess/shortage and trends, comparing the pricing to the same item is not as effective as an ongoing daily or even hourly comparison to the prices of similar item groups.

As a result, product/item price anomalies remain a major concern within the retail industry for which there is no real-time, accurate, and cost-effective solution.

SUMMARY

In various embodiments, methods and a system for real-time alerts for abnormal item pricing are presented.

According to an aspect, a method for real-time alerts for abnormal item pricing is presented. For example, an item code and a transaction item price for an item being processed in a transaction are received. A group of other item codes that are similar to the item code are obtained based on transaction contexts. A catalogue item price for the item code and other catalogue item prices for the other item codes are acquired. A determination is made as to whether to send a real-time price alert for the transaction based at least on the transaction item price, the catalogue item price, and the other catalogue item prices.

DETAILED DESCRIPTION

Figure 1A:
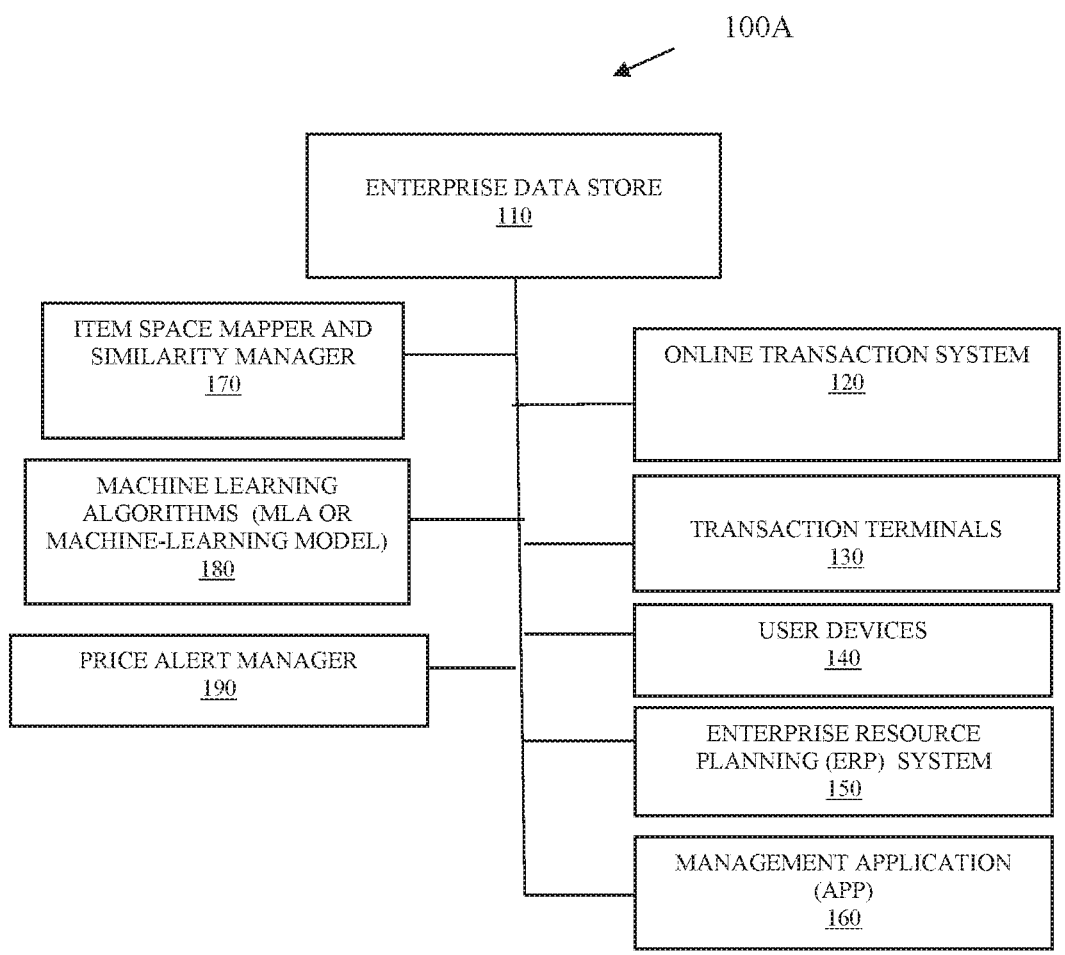
FIG. 1A is a diagram of a system for real-time alerts for abnormal item pricing, according to an example embodiment.

FIG. 1A is a diagram of a system 100 real-time alerts for abnormal item pricing, according to an example embodiment. It is to be noted that the components are shown schematically in greatly simplified form, with only those components relevant to understanding of the embodiments being illustrated.

Furthermore, the various components (that are identified in the FIGS. 1A and 1B) are illustrated and the arrangement of the components is presented for purposes of illustration only. It is to be noted that other arrangements with more or less components are possible without departing from the teachings of real-time alerts for abnormal item pricing presented herein and below.

The system 100A provides a mechanism by which non-standard deviations in prices for items are detected in real time and provided to transaction systems, management applications, and/or Enterprise Resource Planning (ERP) systems. What constitutes non-standard deviations can be custom defined by the retailer. Each item is mapped to multidimensional space based on that item's context defined in transaction histories for transactions that comprised the item. Similar items are determined based on distances between the mapped items' contexts within the multidimensional space. For any given item being purchased in a transaction, the catalogue price for the item and the actual price (after any transaction promotion/discount is applied or any transaction override for the item price during the transaction) are obtained. Next, N similar items to the item are derived from the multidimensional space, the prices known for those similar items are obtained, and a median price for the N similar items is calculated. The actual transaction price (after coupons/discounts or price override) for the item is then compared to the median price for the N similar items and a deviation in price is determined. The deviation is then compared to a retailer-defined threshold percentage deviation (retailer can set the threshold percentage), which when exceeded causes an alert to be raised in real time to the transaction systems, management applications, and/or ERP systems.

Because similar items are determined based on the items' transaction contexts, high-end items that command much higher prices will not be identified as being similar to non high-end items that command lower prices. This ensures that the prices of two items having a same item type but associated with different pricing schemes are not identified as being similar resulting in erroneous price anomaly alerts during a transaction comprising either a high-end item or a non high-end item. For example, wines comprise large variances in prices based on brand; a high-end wine's price for a given transaction will result in comparison of that high-end wine's transaction price against a median wine price for similar high-end wine prices.

System 100A comprises an enterprise data store 110, an online transaction system 120, in-store transaction terminals 130, user devices 140, an ERP system 150, a management application (app) 160, an item space mapper and similarity manager 170, one or more machine-learning algorithms (MLA) 180, and a price alert manager 190. System 100A comprises a variety of computing devices, each of which comprises at least one processor and a non-transitory computer-readable storage medium comprising executable instructions. The executable instructions when executed by the corresponding processor from the corresponding non-transitory computer-readable storage medium causes that processor to perform operations discussed herein and below with respect to the components 110-190.

An "item code" represents an item from a given retailer's product catalogue. Each item code's affinity/similarity to the other item codes defines that item's vector in multidimensional space. The affinity/similarity and item code vector determined by Word2Vec algorithms based on analysis of the retailer's transaction histories and product catalogue. An "item vector" is a mathematical expression showing points within the multidimensional space representing the contexts of a given item.

Enterprise data store 110 includes a variety of enterprise data, such as transaction histories for transactions performed with a retailer. Other types of data may be included in enterprise data store 100 as well, such as incentives available to consumers, item prices for the transaction, customer data for known customers (loyalty data, profile data, etc.), the transaction details for transactions of customers (including item codes for items), item or product catalogue data, and other information captured and retained by the enterprise for the store and other stores associated with the enterprise (retailer).

Online transaction system 120 comprises interfaces and corresponding software by which customers perform online transactions with a retailer, such as via browsing items, storing selected items in a virtual cart, and checking out (paying for) items in the virtual cart. The online transaction system 120 can be web-based and/or mobile app-based. Virtual cart data provided in real time from online transaction system 120 to enterprise data store 110 or provided via an Application Programming Interface (API) in real time to price alert manager 190 during an online shopping session.

Transaction terminals 130 comprise peripheral devices (scanners, printers, media acceptors/dispensers, weigh scales, Personal Identification Number (PIN) pads, card readers, etc.) and corresponding software for performing customer checkouts associated with transactions, Real-time item and transaction data provided by terminals to enterprise data store 110.

User devices 140 comprise peripherals (touchscreens, cameras, etc.) and corresponding software for performing customer transactions using a web browser or a mobile application (app). Real time transaction data provided by any app to enterprise data store 110.

EPR system 150 comprises devices and corresponding software and user interfaces for enterprise transactions, inventory management, item purchase orders, etc. Any item price in a given ERP operation is sent, via an API, to price alert manager 190 for price anomaly and price conformance processing.

Item space mapper and similarity manager 170 initially generates vectors for item codes in a product catalogue (obtained from enterprise data store 110) using transaction histories (again, obtained from enterprise data store 110). In this manner, the item codes in the product catalogue are assigned vectors that map to multidimensional space. Each vector linked to the item codes of the product catalogue. "Item embedding" is applied using a "Word2Vec" algorithm. Word2Vec is a group of algorithms used primarily in the field of Natural Language Processing (NLP) for machine translation. The Word2Vec takes as its input a large corpus of text (product catalogue of item codes and transaction histories from enterprise data store 110) and produces a vector space of typically several hundred dimensions (multidimensional space), each unique word (item code) in the corpus being assigned a corresponding unique vector plotted in the multidimensional space. In this way, item codes that share common contexts within the transaction histories are plotted in close proximity to one another within the multidimensional space. The transaction histories are provided as sentences to the Word2Vec algorithm and the words are the item codes (all words available are identified from the product catalogue). Mathematical calculations can be applied on the vectoral numeric representations (vectors) for the item codes.

Once the product catalogue and transaction histories are processed to create the item code vectors for the items, item space mapper and similarity manager 170 can be provided a given item code (as input), the given item code representing an item in a given transaction. A configured number of N similar item codes can be identified based on distances between the given item's mapped context within the multidimensional space and other mapped items' contexts plotted within the multidimensional space. The output produced by the Word2Vec algorithm is similar item codes (replacement items) along with similarity scores (which correspond to the distances within the multidimensional space between the position of the provided item code and the positions of similar item codes), Item space mapper and similarity manager 170 can determine the similar item codes to provide price alert manager 190 based on a preset threshold (which can be set by the retailer) value or range of values and/or based on a predefined number of top similarity scores.

Item space mapper and similarity manager 170 provides the similar item codes along with the similarity scores to price alert manager 190. Price alert manager 190 obtains a catalogue price for the item code associated with a given transaction and the catalogue prices of each of the similar item codes. A median price is calculated for the similar item codes. The actual item price for the item of the transaction (including any transaction item coupon/discount or item price override for the transaction) is then compared to the median price for the prices of the similar item codes and a price deviation is derived. The price deviation can be above or below the median price. The price deviation is then compared to a retailer-set deviation threshold amount and when the price deviation exceeds or falls below the threshold amount, price alert manager 190 sends a real-time alert to online transaction system 120, transaction terminal 130, user device 140, ERP system 150, and/or management app 160 for further processing or handling during the transaction.

As system 100 is deployed, feedback is monitored for the actual transactions that were provided price alerts for item prices that fell outside the retailer-defined threshold amount. The feedback is an indication as to an action taken based on the alert, such as ignored (the anomalous item price was allowed for the transaction) or price was adjusted for the transaction. A change in item price for a transaction is considered to be positive feedback whereas no change in the item price following a price alert is considered to be negative feedback.

One or more MLAs 180 are trained on input comprising item code vectors plotted within multidimensional space, a current transaction price associated with the item, a current catalogue price for the item, any transaction discount or transaction override item price for the item, and item prices for items similar to the item (based on a highest similarity score for the similar items returned by the item space mapper and similarity manager 170). The trained MLAs 180 represented a machine-learning model used for item price alerts based on item affinities and prices of items. Thus, as used herein MLA 180 may also be referred to as a machine-learning model.

The trained result to which the MLAs 180 configure to achieve based on the provided input parameters is a determination as to whether a real-time price alert for a given item of a current transaction is to be provided or not provided. During training, anomalous prices and acceptable prices are identified as the results expected to be provided by the MLAs 180.

Once the MLAs 180 are trained a machine-learning model for price alerts is ready for use during transaction processing by price alert manager 190, price alert manager 190 receives in real-time an item price for a transaction along with any item discount in price or other item price override. Item space mapper and similarity manager 170 returns similar item codes and corresponding similarity scores between the similar item codes and the item code associated with the transaction. Price alert manager 190 obtains catalogue prices for the item of the transaction and for each of the similar items. Price alert manager 190 provides the item's catalogue price, actual transaction item price, any transaction item price discount or override, and catalogue prices for the similar items to MLA 180, and MLA 180 returns a decision as to whether a price alert should be raised or not to price alert manager 190.

It is to be noted, that price alert manager 190 may determine on its own whether a price alert is needed without the assistance of MLA 180 by calculating a median price for the similar items and comparing the deviation in the actual item price (including any discount or item price override) against the retailer-defined deviation threshold.

Furthermore, both MLA 170 and price alert manager 190 may separately and independently determine whether a price alert is needed for a given item price of a transaction. This may be useful to achieve an accuracy rate with the MLA 170 before removing the alert processing decision from price alert manager 190 and allowing MLA 170 to make price alert decisions.

The machine-learning model associated with the MLAs 180 are continually retrained based on the feedback. This ensures that item price alerts are tailored to a given store's item pricing strategy and goals. In this way, the accuracy of item price alerts performed by the machine-learning model is continuously improving and learning.

It is also to be noted that retailer's may remove a need to provide and define any item price deviation threshold amounts for items of the catalogue once the MLAs 180 are fully deployed within the transaction processing workflow.

An example processing context associated with system 100 to determine whether a price alert is to be sent or not may include pasta #1 having a price of $8, pasta #2 having a price of $9, and pasta #3 having a price of $10. Price alert manager 190 will not send any price alerts for any of these prices during transactions because they do not standout from one another. In a second context, pasta #1 has a price of $5, pasta #2 has a price of $9, and pasta #3 has a price of $10; however, pasta #1 has a promotion/discount; here, price alert manager 190 will not raise a price alert because pasta #1 is associated with a known price discount. In a third context, pasta #1 has a price of $5, pasta #2 has a price of $9, and pasta #3 has a price of $10; there a no known promotions with any of the pastas; as a result, price alert manager 190 raises a price alert for the transaction having pasta #1 with a price of $5 because this is abnormal price (because price alert manager 190 determined that $5 deviated from the price median of the pastas #1, #2, and #3 by more than a retailer-defined threshold or because trained MLAs 180 determined the anomaly).

Components 170-190 may be provided as a web-based and/or cloud-based service to retailers wherein an API to the service is provided to access each retailer's enterprise data store 110 and communicate substitute/replacement item codes during transactions. The API permits a management app 160 for use by managers to obtain price alerts during transactions, such that managers can identify mistakes or fraud in real time of employees checking customers out during transactions or customers performing self-checkouts.

User-operated devices 140 can be any consumer-operated device, such as wearable processing devices, voice-enabled network appliances (Internet-of-Things (IoTs) devices), laptops, desktops, tablets, network-based vehicle-integrated devices, and others. Devices 140 can also be operated by employees of a retailer that utilize price alert manager 150. Devices 140 utilize retailer-provided interfaces (web-based and/or app-based interfaces) to perform shopping and transaction basket checkouts with transaction services of network servers 120.

Transaction terminals 120 can be Point-Of-Sale (POS) terminals, Self-Service Terminals (SSTs), staff-operated mobile devices, and/or kiosks.

Figure 1B:
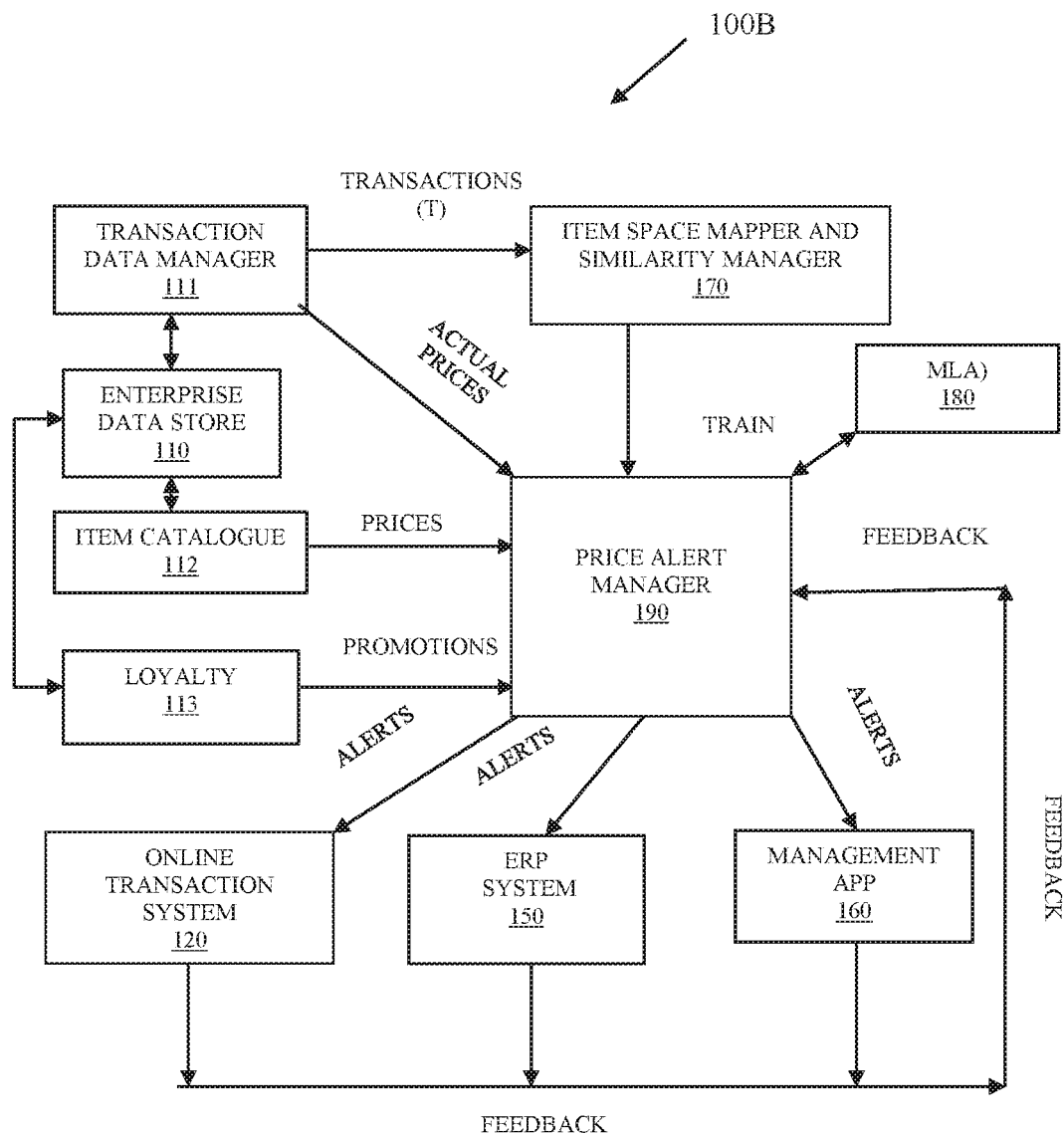
FIG. 1B is a diagram representing a process flow of the system of FIG. 1A, according to an example embodiment.

FIG. 1B is a diagram representing a process flow 100B of the system of FIG. 1A, according to an example embodiment.

FIG. 1B illustrates a more fine-grain view of some components associated with system 100A.

Transaction data manager 111 provides transaction data from enterprise data store to item space mapper and similarity manager 170. Item space mapper and similarity manager 170 generates the multidimensional vector space and unique vectors plotted within that space for each item code of the item catalogue 112.

Price alert manager 190 trains the MLAs 180 based on item catalogue codes, similar item codes and their catalogue item prices, real transaction item prices along with any item discounts or item price overrides, loyalty transaction data 113, and feedback obtained across multiple channels where transaction were conducted by online transaction system 120, ERP system 150, and management app 160.

Subsequently, when any given transaction of a customer for a transaction (via online transaction system 120 or ERP system 150), an item's transaction price can be evaluated in real time by price alert manager 190 and/or MLAs 180 to determine whether a real-time price alert for an item prices of the transaction should or should not be raised to online transaction system 120, ERP 150, and/or management app 160. Price alert manager 190 provides as input to MLA 180, the item code, the item catalogue price, the item prices of similar items to the transaction item (based on a configured number of highest similarity scores returned by item space mapper and similarity manager 170, the actual transaction price being processed for the item with the transaction, and any transaction item price discount or transaction item price override. MLA 180 provides as output a decision as to whether a price alert should be raised or not raised, Price alert manager 190 using an API to communicate a price alert for the corresponding item of the corresponding transaction to the online transaction system 120, ERP system 150, and/or management app 160). Results positive or negative are fed back to price alert manager 190 through the API or derived by price alert manager 190 from final transaction data or sales date in the case of management app 160. The feedback is used in subsequent training sessions of MLA 180.

In an embodiment, components 110-113 and 170-190 are provided as a single cloud-based service to components 120, 150, and 160 via an API.

These and other embodiments are now discussed with reference to the FIGS. 2-3.

Figure 2:
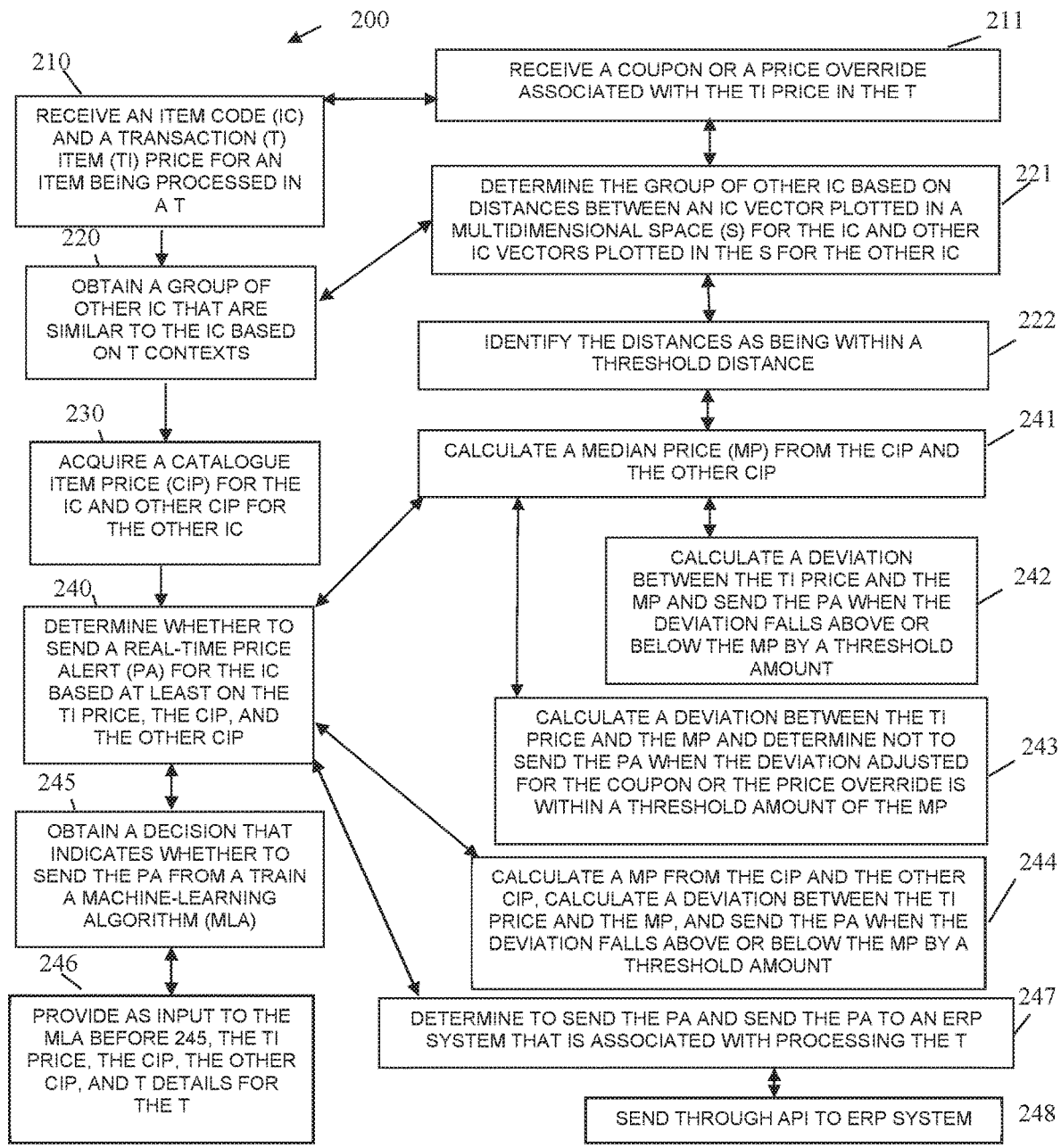
FIG. 2 is a diagram of a method for real-time alerts for abnormal item pricing, according to an example embodiment.

FIG. 2 is a diagram of a method 200 for real-time alerts for abnormal item pricing, according to an example embodiment. The software module(s) that implements the method 200 is referred to as a "price alert manager." The price alert manager is implemented as executable instructions programmed and residing within memory and/or a non-transitory computer-readable (processor-readable) storage medium and executed by one or more processors of a device. The processor(s) of the device that executes the price alert manager are specifically configured and programmed to process the price alert manager. The price alert manager has access to one or more network connections during its processing. The network connections can be wired, wireless, or a combination of wired and wireless.

In an embodiment, the device that executes the price alert manager is a server. In an embodiment, the server is a cloud processing environment that comprises multiple servers cooperating with one another as a single server. In an embodiment, the server is a Local Area Network (LAN) server.

In an embodiment, the price alert manager is all of or some combination of 170-190.

In an embodiment, the price alert manager performs the processing discussed above with system 100A and process flow 100B.

In an embodiment, the price alert manager is provided as a SaaS to a plurality of enterprises, each enterprise having a subscription relevant to its customers and enterprise data store 110.

At 210, the price alert manager receives an item code and a transaction item price for an item being processed in a transaction.

In an embodiment, at 211, the price alert manager receives a coupon, or a price override associated with the transaction item price in the transaction.

At 220, the price alert manager obtains a group of other item codes that are similar to the item code based on transaction contexts of transaction histories having the item code and the other item codes.

In an embodiment of 211 and 220, at 221 the price alert manager determines the group of other item codes based on distances between an item vector plotted in a multidimensional space for the item code and other item code vectors plotted in the multidimensional space for the other item codes.

In an embodiment of 221 and at 222, the price alert manager identifies the distances as being within a threshold distance.

At 230, the price alert manager acquires a catalogue item price for the item code and other catalogue items' prices for the other item codes.

At 240, the price alert manager determines whether to send a real-time price alert for the item code based at least on the transaction item price, the catalogue item price, and the other catalogue items' prices.

In an embodiment of 222 and 240, at 241, the price alert manager calculates a median price from the catalogue item price and the other catalogue items' prices.

In an embodiment of 241, at 242, the price alert manager calculates a deviation between the transaction item price and the median price and sends the real-time price alert when the deviation falls above of below the median price by a threshold amount.

In an embodiment of 241, at 243, the price alert manager calculates a deviation between the transaction item price and the median price and determines not to send the real-time price alert when the deviation adjusted for the coupon or the price override is within a threshold amount of the median price.

In an embodiment, at 244, the price alert manager calculates a median price from the catalogue item price and the other catalogue items' prices. The price alert manager further calculates a deviation between the transaction item price and the median price and sends the real-time price alert when the deviation falls above or below the median price by a threshold amount.

In an embodiment, at 245, the price alert manager obtains a decision that indicates whether to send the real-time price alert from a trained machine learning algorithm associated with a machine-learning model.

In an embodiment of 245 and at 246, the price alert manager provides as input to the machine-learning model (before 245), the transaction item price, the catalogue item price, and the other catalogue items' prices, and transaction details for the transaction.

In an embodiment, at 247, the price alert manager determines to send the real-time price alert and sends the real-time price alert to an ERP system that is associated with processing the transaction.

In an embodiment of 247 and at 248, the price alert manager sends the real-time price alert to the ERP system via an API.

Figure 3:
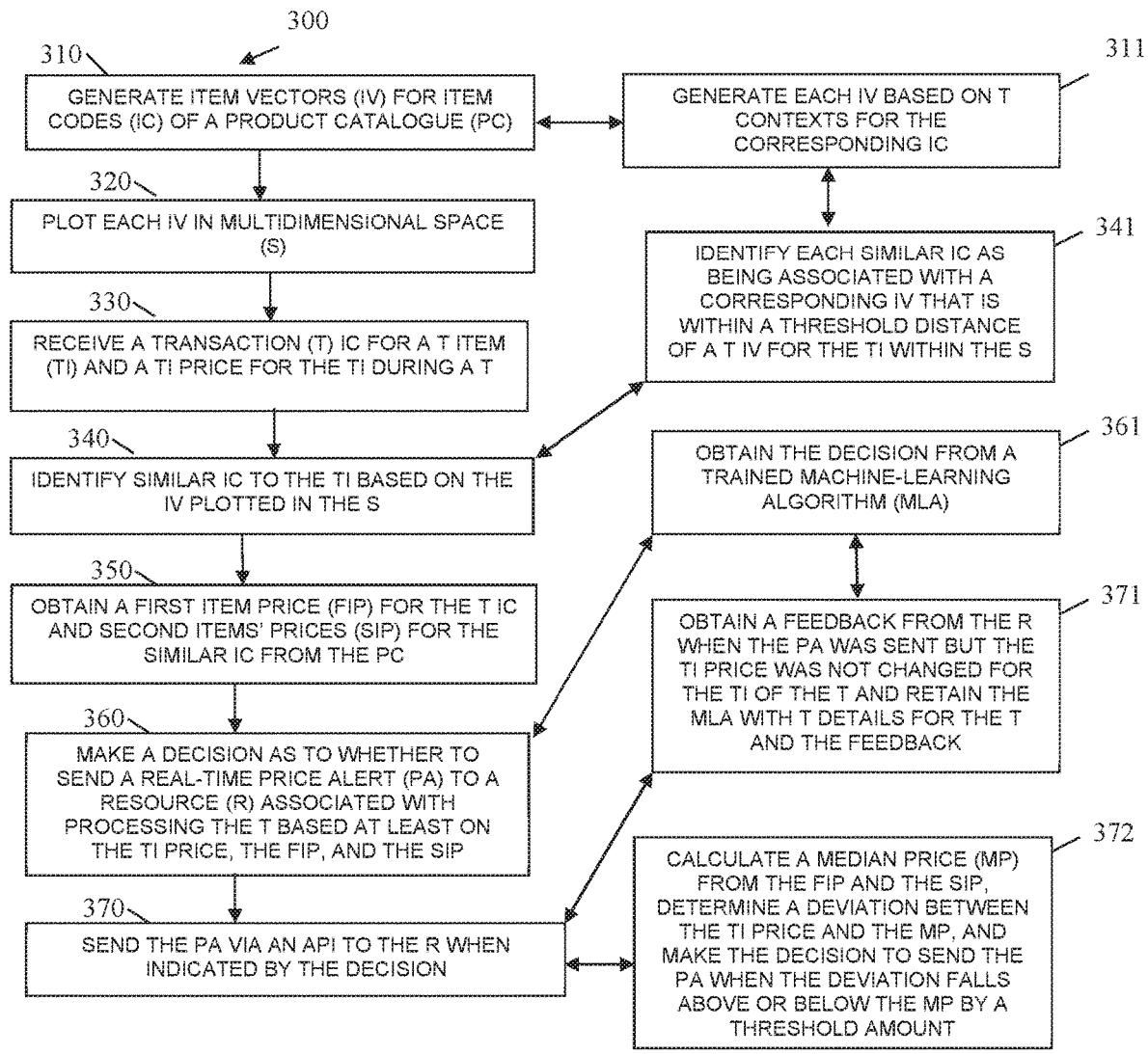
FIG. 3 is a diagram of another method for real-time alerts for abnormal item pricing, according to an example embodiment.

FIG. 3 is a diagram of another method 300 for real-time alerts for abnormal item pricing, according to an example embodiment. The software module(s) that implements the method 300 is referred to as an "item price anomaly manager." The item price anomaly manager is implemented as executable instructions programmed and residing within memory and/or a non-transitory computer-readable (processor-readable) storage medium and executed by one or more processors of a device. The processors that execute the item price anomaly manager are specifically configured and programmed to process the item price anomaly manager. The item price anomaly manager has access to one or more network connections during its processing. The network connections can be wired, wireless, or a combination of wired and wireless.

In an embodiment, the device that executes the item price anomaly manager is a server. In an embodiment, the server is a cloud processing environment that comprises multiple servers cooperating with one another as a single server. In an embodiment, the server is a LAN server that is local to a retail store.

In an embodiment, the item price anomaly manager is all or some combination of 170-190, process flow 100B, and/or the method 200.

The item price anomaly manager presents another and, in some ways, enhanced processing perspective to that which was described above with the FIG. 2.

At 310, the item price anomaly manager generates item vectors for item codes of a product catalogue.

In an embodiment, at 311, the item price anomaly manager generates each item vector based on transaction contexts for the corresponding item code.

At 320, the item price anomaly manager plots each item vector in multidimensional space.

At 330, the item price anomaly manager receives a transaction item code for a transaction item and a transaction item price for the transaction item during a transaction.

At 340, the item price anomaly manager identifies similar item codes to the transaction item based on the item vectors plotted in the multidimensional space.

In an embodiment of 311 and 340, at 341, the item price anomaly manager identifies each similar item code as being associated with a corresponding item vector that is within a threshold distance of a transaction item vector for the transaction item within the multidimensional space.

At 350, the item price anomaly manager obtains a first item price for the transaction item code and second items' prices for the similar item codes from the product catalogue.

At 360, the item price anomaly manager makes a decision as to whether to send a real-time price alert to a resource associated with processing the transaction based at least on the transaction item price, the first item price, and the second items' prices.

In an embodiment, at 361, the item price anomaly manager obtains the decision from a trained machine-learning algorithm based on a machine-learning model.

At 370, the item price anomaly manager sends the real-time price alert via an API to the resource when indicated by the decision.

In an embodiment of 361 and 370, at 371, the item price anomaly manager obtains a feedback (result) from the resource or from transaction data associated with a completed transaction when the real-time price alert was sent to the resource but the transaction item price was not changed for the transaction item. The item price anomaly manager uses the feedback to retain the machine-learning algorithm or model with transaction details for the transaction and the feedback.

In an embodiment, at 372, the item price anomaly manager calculates a median price from the first item price and the second items' prices and determines a deviation between the transaction item price and the median price. The item price anomaly manager makes a decision to send the real-time price alert when the deviation falls above or below the median price by a threshold amount.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method for raising an alert to a system for a specific item based on a price analysis and deviations in a given price for the specific item, comprising:

providing instructions to a processor of a server causing the processor to perform operations, comprising:

generating item vectors for item codes of a product catalogue by and for each item code, generating coordinates within a multidimensional space associated the corresponding item code and previous transaction item codes purchased with the corresponding item code in previous transactions associated with the corresponding item code to generate the corresponding item vector for the corresponding item code;

plotting each item vector represented by the corresponding coordinates in the multidimensional space as an item context for the corresponding item code within the multidimensional space;

receiving a transaction item code for a transaction item and a transaction item price for the transaction item during a transaction, wherein the transaction item price is any adjusted price for the transaction item based on any discount applied to the transaction item during the transaction;

generating a current item vector based on the transaction item code and other item codes present in the transaction;

plotting the current item code in the multidimensional space;

identifying similar item codes to the transaction item based on the item vectors plotted in the multidimensional space by comparing the item vectors associated with the transaction item against the item vectors associated with the similar item codes within the multidimensional space;

obtaining a first item price for the transaction item code and second items' prices for the similar item codes from the product catalogue; and making a decision as to whether to send a real-time price alert to a resource associated with processing the transaction based at least on the transaction item price, the first item price, and the second items' prices;

sending the real-time price alert via an Application Programming Interface (API) to the resource when indicated by the decision causing the resource to perform transaction processing for the transaction based on the real-time price alert received by the resource during the transaction; and obtaining a feedback from the resource when the real-time price alert was sent but the transaction item price was not changed for the transaction item of the transaction and training a machine-learning algorithm with transaction details for the transaction, the alert, and the feedback to predict future decisions, wherein the feedback is an indication as to an action taken based on the alert, wherein the action taken can include ignored with no price change to the transaction item price or a price change was made to the transaction item price based on the alert.

2. The method of claim 1, wherein generating the item vectors further includes generating each item vector based on transaction contexts for the corresponding item code appearing in the corresponding previous transactions.

3. The method of claim 2, wherein identifying further includes identifying each similar item code as being associated with a corresponding item vector that is within a threshold distance of a transaction item vector for the transaction item within the multidimensional space.

4. The method of claim 1, wherein making further includes obtaining the decision from the machine-learning algorithm.

5. The method of claim 1, wherein making further includes, calculating a median price from the first item price and the second items' prices, determining a deviation between the transaction item price and the median price, and making the decision to send the real-time price alert when the deviation falls above or below the median price by a threshold amount.

6. A system for raising an alert to a system for a specific item based on a price analysis and deviations in a given price for the specific item, comprising:

at least one processing device having at least one processor configured to execute instructions from a non-transitory computer-readable storage medium;

the instructions when executed by the at least one processor from the non-transitory computer-readable storage medium cause the at least processor to perform operations comprising:

mapping item codes from a product catalogue to vectors plotted in multidimensional space by and for each item code, generating coordinates within the multidimensional space associated the corresponding item code and previous transaction item codes purchased with the corresponding item code in previous transactions associated with the corresponding item code to generate the corresponding vector for the corresponding item code and plotting each vector using the corresponding coordinates as an item context for the corresponding item code within the multidimensional space;

determining similarities between a transaction item code associated with a transaction item of a transaction being processed and other item codes based on the corresponding vectors plotted in the multidimensional space by generating a current item vector based on the transaction item code and the other item codes present in the transaction, plotting the current item vector in the multidimensional space and identifying the similarities by evaluating the current item vector against the vectors plotted in the multidimensional space;

obtaining a transaction item price being used from the transaction for the transaction item;

obtaining a first item price for the transaction item code from a catalogue wherein the first item price is any adjusted price for the transaction item based on any discount applied to the transaction item during the transaction;

obtaining second items' prices for the other item codes;

calculating a median price from the first item price and the second items' prices;

calculating a deviation between the transaction item price and the median price; and sending a real-time price alert to a resource associated with processing the transaction when the deviation falls above or below the median price by a threshold amount causing the resource to perform transaction processing for the transaction based on the real-time price alert received by the resource during the transaction; and obtaining a feedback from the resource when the real-time price alert was sent but the transaction item price was not changed for the transaction item of the transaction and training a machine-learning algorithm with transaction details for the transaction, the alert, and the feedback to predict future decisions, wherein the feedback is an indication as to an action taken based on the alert, wherein the action taken can include ignored with no price change to the transaction item price or a price change was made to the transaction item price based on the alert.

7. The system of claim 6, wherein the resource is an online transaction system, a transaction terminal, an Enterprise Resource Planning (ERP) system, or a management application.

* * * * *